(12) United States Patent
Zettner

(10) Patent No.: US 8,358,094 B2
(45) Date of Patent: Jan. 22, 2013

(54) ARRANGEMENT HAVING AN ELECTRIC MACHINE AND METHOD FOR OPERATING AN ELECTRIC MACHINE

(75) Inventor: Jürgen Zettner, Veitsbronn (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 13/391,181

(22) PCT Filed: Aug. 19, 2009

(86) PCT No.: PCT/EP2009/060701
§ 371 (c)(1),
(2), (4) Date: Feb. 17, 2012

(87) PCT Pub. No.: WO2011/020500
PCT Pub. Date: Feb. 24, 2011

(65) Prior Publication Data
US 2012/0146563 A1    Jun. 14, 2012

(51) Int. Cl.
*G05D 23/08* (2006.01)
(52) U.S. Cl. ....... 318/473; 318/490; 318/471; 236/74 R; 236/67; 322/34; 322/35; 388/934
(58) Field of Classification Search .................. 310/214, 310/215; 318/490, 471, 473; 388/934; 322/34, 322/35; 236/74 R, 67
See application file for complete search history.

(56) References Cited

U.S. PATENT DOCUMENTS

| | | | | |
|---|---|---|---|---|
| 5,341,095 | A * | 8/1994 | Shelton et al. | 324/765.01 |
| 6,995,529 | B2 * | 2/2006 | Sibley | 318/161 |
| 7,166,978 | B2 * | 1/2007 | Carson et al. | 318/432 |
| 7,710,081 | B2 * | 5/2010 | Saban et al. | 322/89 |
| 7,769,552 | B2 * | 8/2010 | Colby et al. | 702/65 |
| 7,960,948 | B2 * | 6/2011 | Saban et al. | 322/89 |
| 8,102,140 | B2 * | 1/2012 | Gao et al. | 318/727 |
| 2002/0163278 | A1 | 11/2002 | Coupart | |
| 2009/0134832 | A1* | 5/2009 | Knauff | 318/490 |
| 2009/0320468 | A1* | 12/2009 | Shimizu et al. | 60/608 |

FOREIGN PATENT DOCUMENTS

| | | | |
|---|---|---|---|
| JP | 55099033 A | | 7/1980 |
| JP | 2004116316 A | | 4/2004 |
| WO | WO 2010/006631 | * | 1/2010 |
| WO | WO 2010/006631 A1 | | 1/2010 |

* cited by examiner

*Primary Examiner* — Rita Leykin
(74) *Attorney, Agent, or Firm* — Henry M. Feiereisen, LLC

(57) ABSTRACT

The invention relates to a method and arrangement having an electric machine, comprising a stator (4) and a rotor (1) and an infrared temperature sensor, wherein the detection field of the infrared temperature sensor is directed at an outer surface of the rotor (1). The infrared temperature sensor is a thermopile (6) for radiometrically contactlessly detecting a temperature of the rotor (1), the thermopile being arranged in a slot of the stator (4) and being compatible with standard slot-sealing-wedge components of the electric machine with regard to assembly, and thus enables the operational monitoring of the thermal state of an electric machine in a novel manner, such that adapted power states can be achieved.

12 Claims, 3 Drawing Sheets

ARRANGEMENT HAVING AN ELECTRIC MACHINE AND METHOD FOR OPERATING AN ELECTRIC MACHINE

CROSS-REFERENCES TO RELATED APPLICATIONS

This application is the U.S. National Stage of international Application No. PCT/2009/060701, filed Aug. 19, 2009, which designated the United States and has been published as International Publication No. WO 2011/020500.

BACKGROUND OF THE INVENTION

The invention relates to an arrangement having an electrical machine, and to a method for operating an electrical machine.

In devices with complicated installation settings and extreme environmental conditions, it is often not readily possible to measure a temperature using contact thermometers. Particularly in the case of electrical machines, that is to say in the case of electric motors and generators, temperature measurement at rotating parts presents a problem in practice. Therefore, it is desirable to monitor the temperature of the rotor of electric motors and generators, for example, since such monitoring allows conclusions to be drawn about the operating state of the electrical machine and makes it possible to optimize the rating of the power class of the electric motor. As a result, it is possible, in particular, to avoid overdimensioning of the motor, this often being performed in order, amongst other things, to prevent overheating of permanent magnets which demagnetize when a limit temperature is exceeded. Furthermore, temperature monitoring can also be used for controlling the motor, as a result of which optimum utilization, that is to say particularly economical or power-oriented operation, is rendered possible.

The international patent application with the application file reference PCT/EP2008/006077 already discloses an arrangement for detecting the temperature of a rotor of an electrical machine, with the stator of the electrical machine having a radial or at least substantially radial opening (that is to say an opening which runs perpendicular to the rotation axis of the rotor) through which the temperature of the rotor can be detected in a contact-free manner by means of a pyrometer. In this case, it is known to provide an infrared temperature sensor having an upstream optical system, for example a lens system, in the outer lateral surface of the electrical machine, that is to say of the stator, as a result of which the thermal radiation from the rotor, and therefore the surface temperature of said rotor, can be detected.

This arrangement has the disadvantage that a radial opening ("hole") in the stator of an electrical machine can, on account of the windings accommodated there, and in the case of compact electrical machines, in particular, be realized only with difficulty or, for structural reasons, is impossible in many places and is often even totally impossible. In addition, said optical system, that is to say the lens system, is required on account of the distance between the external infrared temperature sensor and the surface of the rotor, this increasing the costs of the arrangement. Finally, the "duct" which is provided for the temperature detection process, that is to say the substantially radial opening in the stator of the electrical machine, can become clogged with dirt particles over the course of time, with the result that a temperature detection process becomes corrupted or even impossible.

A further problem is presented by reflections, in particular in the interior of the duct, and also emissions owing to the intrinsic heat of the stator in this region, this possibly also corrupting measurements. While relatively large electrical machines, in particular, have cooling air holes in some cases, said cooling air holes being suitably designed radially with respect to the rotor, such holes are not conventional or, for reasons of space, cannot be realized at all in medium-sized and relatively small electrical machines, in particular.

SUMMARY OF THE INVENTION

Therefore, one problem addressed by the present invention is that of specifying an arrangement for simple, reliable and cost-effective temperature detection for the rotating parts of an electrical machine. A further problem addressed by the present invention is that of specifying a method for operating an electrical machine, in which method thermal overloading of the rotor is reliably avoided.

According to one aspect of the invention, the problem is solved by an arrangement having an electrical machine which includes a stator, a rotor, and an infrared temperature sensor, with the detection field of the infrared temperature sensor being oriented onto a lateral surface of the rotor, wherein the infrared temperature sensor is a thermopile for detecting a temperature of the rotor, the thermopile being arranged in a slot in the stator.

According to one aspect of the invention, the problem is solved by a method for operating an electrical machine, wherein at least one temperature of the rotor of the electrical machine is periodically or continuously detected, with the power of the electrical machine being reduced when a defined limit temperature is reached or exceeded.

It is an essential aspect of the present invention to provide what is known as a thermopile, as it is often called in the prior art, for detecting the temperature of a rotor of an electrical machine, said thermopile being arranged in a slot in the stator of the electrical machine and being set up to detect the temperature of the rotor in a contact-free manner. In this case, a thermopile is an interconnected system (usually in the form of a column or a layered system) having (usually) a plurality of thermocouples which generate a thermoelectric voltage, which in turn can be evaluated for temperature measurement purposes, by means of the Seebeck effect as a function of a captured thermal radiation and a substrate temperature or a temperature of a point of comparison (which can usually also be detected separately).

The solution to the problem provides, in particular, an arrangement having an electrical machine which comprises a stator and a rotor, and also having an infrared temperature sensor, with the detection field of the infrared temperature sensor being oriented onto a lateral surface of the rotor, and with the infrared temperature sensor being a thermopile for detecting a temperature of the rotor, said thermopile being arranged in a slot in the stator. The short distance between the slot in the stator, and therefore the temperature sensor or the thermopile, and the rotor means that a complex optical system for the temperature sensor can be dispensed with. This also means that the connecting lines (signal lines) of the temperature sensor can be laid in the slot in the stator, for example in channels in the upper winding layer. The short distances between the thermal sensor and the surface of the rotor mean that exact (manual) orientation or adjustment during mounting (during insertion) can often be dispensed with. The arrangement according to the invention also has the advantage that, in the narrow air gap with air moving through the rotor, relatively little dirt can enter over the long term and build up on the thermopile inlet window.

The solution to the problem also provides a method for operating an electrical machine using an arrangement according to the invention, with the temperature of the rotor being detected at least once, but ideally continuously, with the power of the electrical machine being reduced or the operating point being adapted when a limit temperature is reached or exceeded. As a result, thermal overloading of the rotor, which can lead to demagnetization of permanent magnets in the rotor amongst other things, can be avoided. In addition, there is thus no need to overdimension electrical machines because the risk of overheating can be virtually precluded by monitoring the actual temperature of the rotor. The thermal state of an electrical machine can be operationally monitored in a novel manner in such a way that adapted power states can be realized and an increase in efficiency, that is to say an energy saving, is achieved by optimally adapted moving masses specifically in the case of dynamic loading. As an alternative, the arrangement can also be used for research purposes on electrical machines, it being possible to detect inhomogeneities in the thermal loading of the rotor and to obtain measurement data in respect of the thermal and electrical design of machines.

Advantageous refinements of the arrangement according to the invention are specified in the dependent patent claims. The features and advantages mentioned in the process also analogously apply to the method according to the invention.

It is particularly advantageous to integrate the infrared temperature sensor, and therefore the thermopile, in a slot sealing wedge of a slot in the stator of an electrical machine. As a result, there is no need to structurally provide further installation space for the thermal sensor. In particular, the total diameter of the electrical machine is not increased or is not substantially increased as a result. A further advantage is that the connection lines of the infrared temperature sensor in the installation space between the stator winding and the slot sealing wedge can be axially routed out of the stator. In this case, it is particularly advantageous for the intrinsic temperature measurement (also called the "measurement at a point of comparison") of the thermopiles themselves to be simultaneously used to detect the (local) temperature of the stator or of the stator winding of the respective phase in question, as a result of which no additional hardware is required for detecting the temperature of the stator or for detecting the temperature of the winding.

Temperature distribution in the longitudinal direction of the electrical machine can be detected when a plurality of infrared temperature sensors are used along the longitudinal axis of the electrical machine or at least one of the infrared temperature sensors can be moved along the longitudinal axis of the electrical machine. In cases in which a plurality of temperature sensors, that is to say thermopiles, are also used, on account of their intrinsic temperature detection, to detect the temperature of the stator or the temperature of that winding in the slot of which they are arranged, it is advantageous to distribute the temperature sensors over slots of different phases, so that a plurality of or all the phases of the electrical machine can be monitored in respect of the temperatures of their windings. Furthermore, the integration in standard components (slot sealing wedge) means that the slots can be freely selected over the circumference, without creating substantial additional expenditure on production/mounting. Insertion into each slot along the circumference is possible. When detecting the temperature of the stator or of the winding for the purpose of monitoring dynamic operating states, it is also advantageous when that side, or the surface of said side, of the thermopile which faces the stator or the winding and which has the sensor for intrinsic temperature measurement (compensation measurement) is in contact with the stator or the winding by means of a material which has good thermal conductivity or a low thermal thickness. Said material can be a thermally conductive paste or a polymer which exhibits good thermal conductivity, or else a metal coupling. To this end, a material with good properties in respect of heat transfer, or a particularly flat design, can advantageously be selected particularly in cases in which the thermopile is fixed in the slot or the slot sealing wedge by means of an adhesive or encapsulation compound. However, as an alternative, for example in the case of introduction by means of standard slot sealing wedges which are composed of highly electrically and thermally insulating plastics, the highest possible thermal decoupling from the slot may also be advantageous in order, in the event of changes in the temperature of the slot, to create only small drift signals, which corrupt the actual measurement signal, through local thermal transportation processes which are produced on the thermopile chip. A higher degree of accuracy, in the event of changing operating states, for the temperature signal of the rotor is then achieved in this case, but this is accompanied by the reduction in the dynamics when detecting the temperature of the slot/winding.

The electrical machine is advantageously equipped with a rotation angle sensor or another device for detecting the rotation angle, and the measured value detection by the thermopiles is triggered by a signal or a signal sequence which is derived from said rotation angle sensor or device, as a result of which a temperature profile can also be detected along a circumferential line of the rotor. In this case, it is advantageous, when detecting the temperature profile, either to temporarily reduce the rotation speed of the electrical machine to such an extent that the rotation frequency of said electrical machine is considerably lower than the limit frequency of the thermopile or thermopiles used, or, if present, to accommodate the thermopiles which belong to different electrical phases such that they are connected in series with one another relative to the rotation angle in such a way that a time or spatial resolution which is relatively high overall can be achieved (scanning averaging, shifting the time delay for each revolution, lock-in method). In this case, a large number of pairs of values comprising rotation angles and the respectively detected temperature is advantageously generated and evaluated during one or more revolutions of the rotor. The temperature profiles obtained in the process are advantageously used to design other electrical machines, to determine the optimum operating point of electrical machines and to adapt operating points, in particular in respect of avoiding excessive heating in magnetic material. This method can also be used for permanently monitoring individual magnets during operation of an electrical machine in order to thus be able to establish manufacturing tolerances or thermal couplings which have changed during operation for individual magnets, since reduced thermal contact with the rotor holder, particularly in the case of changing operating loads, that is to say dynamic thermal conduction processes, can lead to local overheating. As a result, a localizing condition monitoring method would be provided for high-quality machines by virtue of firstly different phases in respect of their slot/winding temperature, secondly individual magnets of the rotors and additionally the length profiles of the temperature distribution of the moving rotor being made accessible to the temperature monitoring system.

The thermopile can be mounted in a particularly simple manner when, for this purpose, a blind hole or a geometrically similar recess, which is open on the side of the stator winding, is made in a slot sealing wedge or in a component which performs the function of the slot sealing wedge for a portion of the slot. The thermopile can be inserted into this blind hole before the slot sealing wedge or the component is mounted, it being possible, for example, for an adhesive bond or a fastening clip to be used for fastening purposes. In the opening region of the thermopile, an opening (hole) can advantageously be provided in the blind hole or in the recess in the slot sealing wedge or the component as an inlet opening for the thermal radiation from the component which is to be detected (here: the rotor), with the diameter of this opening (hole) determining the detection angle for the contact-free temperature detection process. A design of this kind means that the use of a further optical system can be dispensed with, especially since any particles of dirt in the opening are regularly blown away by virtue of the movement of air in the air gap which flows during operation of the electrical machine.

BRIEF DESCRIPTION OF THE DRAWING

Exemplary embodiments of the arrangement according to the invention will be explained below with reference to the drawings. Said exemplary embodiments simultaneously serve to explain a method according to the invention, In the drawings.

DETAILED DESCRIPTION OF PREFERRED EMBODIMENTS

Figure 1:
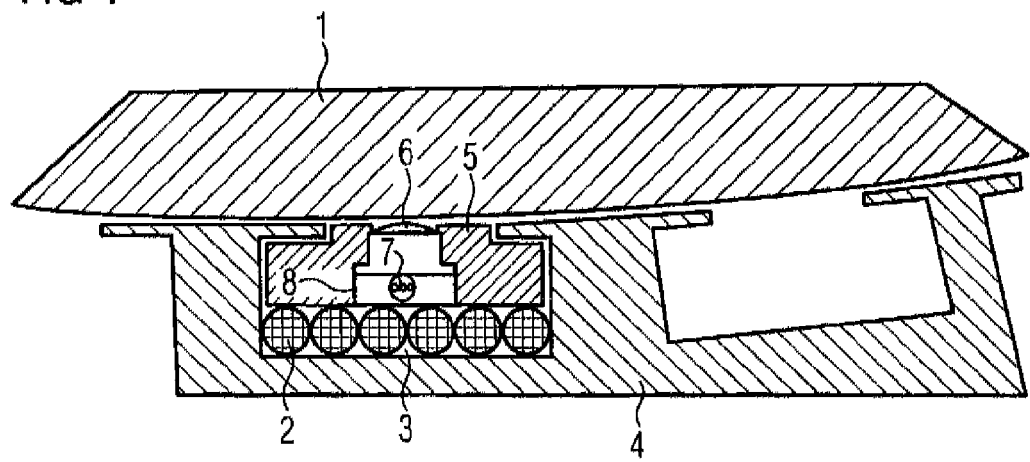
FIG. 1 shows a schematic sectional illustration of the arrangement of a thermopile in the slot sealing wedge of an electrical machine.

FIG. 1 schematically shows a sectional illustration (cross section) of a detail from an electrical machine having a rotor 1 and a stator 4. Slots 3 are made in the stator, with the winding 2 of the stator 4 running in said slots. For reasons of clarity, FIG. 1 shows only one layer with six turns of the winding 2. A blind hole 8 is made in a slot sealing wedge 5 of the slot 3, said blind hole being completely filled by the thermopile 6 (infrared temperature sensor). At the rotor 1 end, the blind hole 8 has a through-hole into which the detection side of the thermopile 6 projects, with this side of the thermopile 6 being composed of a transparent plastic on this side, said plastic having a surface which is configured in the form of a lens. Since the through-hole has a smaller diameter than the blind hole, the blind hole 8 is provided with a depth stop which prevents the thermopile 6 from being able to fall into the air gap between the rotor 1 and the stator 4. At the winding 2 end, the thermopile 6 butts firmly against the winding 2, with the result that it can no longer move in the direction of the stator after the arrangement comprising the slot sealing wedge 5 and the thermopile 6 is mounted. The intrinsic temperature of the thermopile 6 is measured at its winding-side end in this case; for this purpose, a thermally conductive paste or the like can be optionally inserted between the winding 2 and the lower face of the thermopile 6. As an alternative option to clamping the thermopile 6 in the interlocking manner described here, said thermopile 6 can also be fixed using a suitable adhesive or a suitable encapsulation compound.

Figure 4:
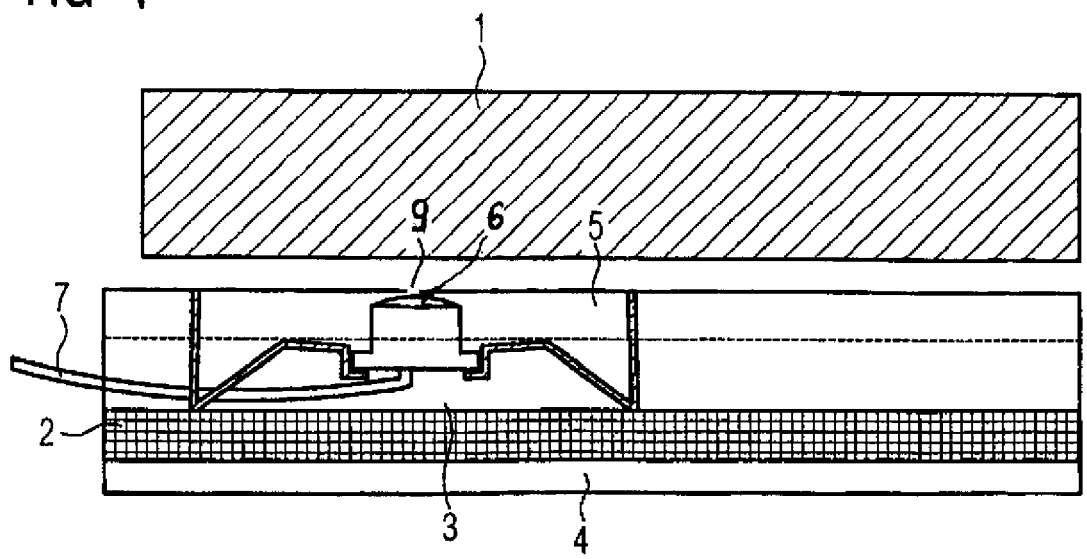
FIG. 4 schematically shows a modification of the fastening of the thermopile by means of a clip.

As shown in FIG. 4 by way of example, an aperture 9 can advantageously be provided in the recess in the slot sealing wedge 5 or the component as an inlet opening for defining a detection angle for the temperature detection by means of the thermopile 6, with the diameter of this aperture 9 determining the detection angle for the contact-free temperature detection process.

Figure 2:
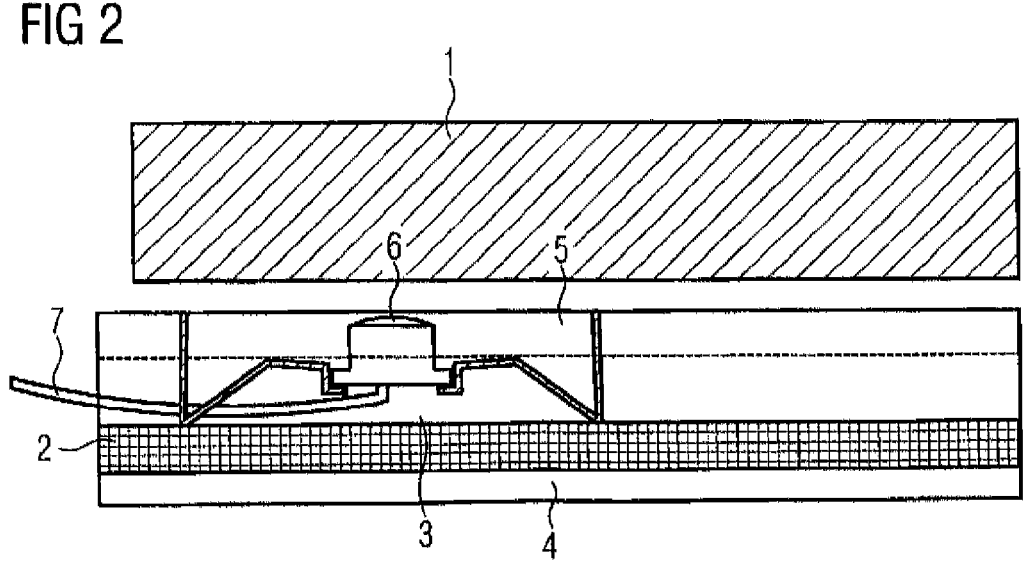
FIG. 2 shows the fastening of the thermopile by means of a clip, FIG. 3 schematically shows a cross section through an electrical machine having three thermopiles which are associated with three different slots and phases in the stator.
Figure 3:
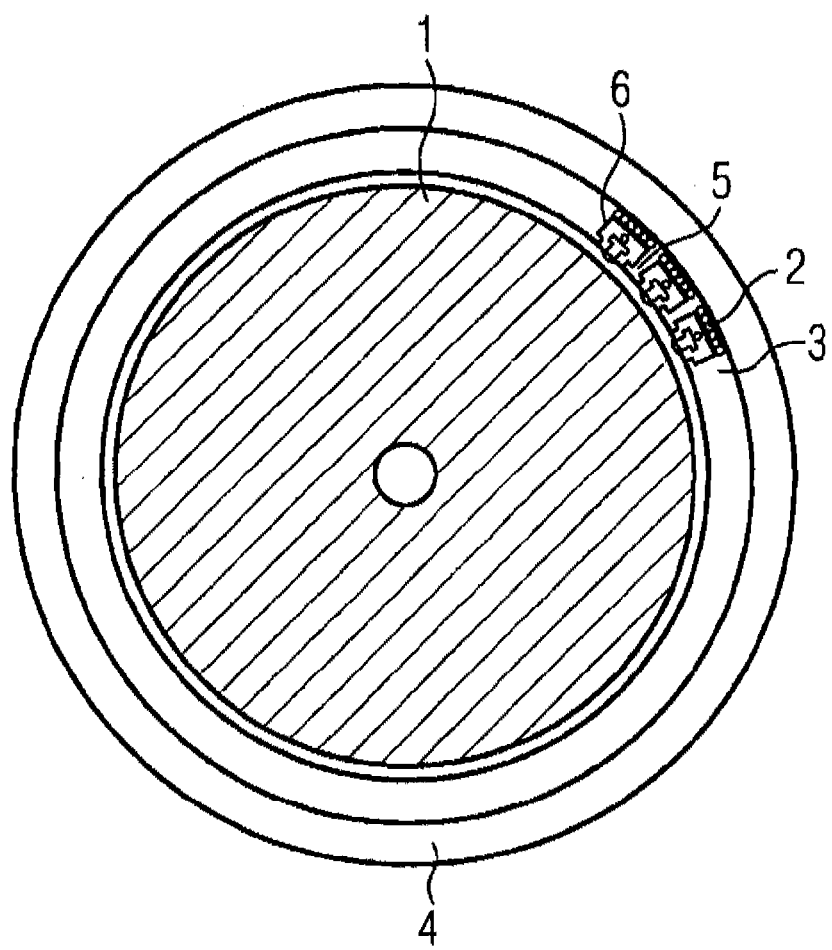

FIG. 2 illustrates a variant of the arrangement from FIG. 1, with all the reference symbols in FIGS. 1, 2 and 3 denoting the same respective items. FIG. 2 shows a side view of an embodiment of the arrangement of the thermopile 6 in the slot 3, with, in contrast to FIG. 1, the thermopile 6 being fixed by means of a metal spring frame in this case. This embodiment can be produced in a particularly simple manner, for example by shaping metal spring sheets by deep-drawing, this being cost-effective particularly for mass production. The spring frame closes off the slot 3 in the longitudinal direction, that is to say the spring frame is matched to the slot geometry and has holes for the cable guide 7 and the thermopile 6 itself. The spring action produces a clamping effect while at the same time providing a simple mounting option. This ensures both that the thermopile 6 is fixed against the upper face of the slot 3 and that it is substantially prevented from rotating. This arrangement can optionally be finally fixed by means of an epoxy resin encapsulation.

FIG. 3 shows, by way of example, a cross-sectional view of a triple arrangement of thermopiles 6 in slot sealing wedges 5, with the three thermopiles 6 being arranged in three windings which belong to different electrical phases, in order to be able to monitor both the temperature of the rotor and the temperature of each individual winding. This is an advantageous refinement because different losses and therefore different temperatures can occur in each phase of the electrical machine. Faults, in particular symmetry problems, can be identified or avoided by an arrangement of this kind. In a further advantageous refinement of this variant having a plurality of thermopiles 6, said thermopiles can be arranged at different points in relation to the longitudinal axis of the electrical machine, with the result that the rotor temperature at one end of the rotor 1 or even at the end face of said rotor can be measured using one of the thermopiles 6, for example, while the lateral surface temperatures in a central region of the rotor 1 can be detected using one or more of the other thermopiles 6.

As an alternative to the diagrams shown in the figures, one or more of the thermopiles 6 can also be arranged in a movable manner in one or more slots 3, for example by means of a roller construction. This makes it possible to carry out detailed investigations into thermal distribution, particularly in the case of experimental electrical machines.

The invention claimed is:

1. An arrangement, comprising:
an electrical machine having a stator and a rotor; and
an infrared temperature sensor generating a detection field oriented onto a lateral surface of the rotor, said infrared temperature sensor being constructed as a thermopile for detecting a temperature of the rotor, said thermopile being arranged in a slot in the stator.

2. The arrangement of claim 1, wherein the thermopile is arranged in a slot sealing wedge of the slot in the stator.

3. The arrangement of claim 1, wherein the thermopile has an intrinsic temperature measuring device configured to detect a temperature of the stator.

4. The arrangement of claim 1, further comprising a plurality of said thermopile arranged along a longitudinal axis of the electrical machine.

5. The arrangement of claim 4, wherein the thermopiles are distributed over slots of at least two different phases.

6. The arrangement of claim 1, wherein the electrical machine has a detection device for detecting a rotation angle of the rotor, said detection device having a coupling for detecting a temperature distribution along a circumference of the rotor.

7. The arrangement of claim 2, wherein the thermopile is arranged in an axial blind hole in the slot sealing wedge, said the blind hole having a through-hole in a direction of the rotor, said through-hole having a diameter which is smaller than a diameter of the blind hole.

8. The arrangement of claim 7, wherein the through-hole is configured in the form of an aperture for defining a detection angle for detection of the temperature by the thermopile.

9. A method for operating an electrical machine having a rotor and a stator, comprising:
periodically or continuously detecting a temperature of the rotor by a thermopile arranged in a slot in the stator; and
reducing a power of the electrical machine when a defined limit temperature is reached or exceeded.

10. The method of claim 9, further comprising detecting a temperature of the stator by an intrinsic temperature measuring device of the thermopile.

11. The method of claim 9, further comprising detecting a rotation angle of the rotor, and detecting a temperature distribution along a circumference of the rotor as a function of the rotation angle.

12. The method of claim 9, further comprising defining a detection angle for detection of the temperature by the thermopile by providing in a slot sealing wedge of a slot in the stator for arrangement of the thermopile an aperture in a direction of the rotor.

* * * * *